(12) United States Patent
Liu et al.

(10) Patent No.: US 9,562,643 B2
(45) Date of Patent: Feb. 7, 2017

(54) BRACKET FOR ELECTRONIC DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chun Liu, Shenzhen (CN); Chih-Kang Cho, New Taipei (TW); Te-Hsu Wang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/547,257

(22) Filed: Nov. 19, 2014

(65) Prior Publication Data

US 2015/0136916 A1 May 21, 2015

(30) Foreign Application Priority Data

Nov. 19, 2013 (CN) .......................... 2013 1 0577191

(51) Int. Cl.
*F16M 11/00* (2006.01)
*F16M 11/04* (2006.01)
*F16M 11/42* (2006.01)
*F16M 11/22* (2006.01)

(52) U.S. Cl.
CPC .............. *F16M 11/04* (2013.01); *F16M 11/22* (2013.01); *F16M 11/42* (2013.01); *F16M 2200/08* (2013.01)

(58) Field of Classification Search
CPC ...... F16M 11/04; F16M 11/42; F16M 2200/08
USPC .................................. 248/121, 129, 157, 159
See application file for complete search history.

(56) References Cited

U.S. PATENT DOCUMENTS

| 5,758,849 | A | * | 6/1998 | Bui | ........................... | A47B 9/10 |
|---|---|---|---|---|---|---|
| | | | | | | 108/145 |
| 6,151,734 | A | * | 11/2000 | Lawrie | ................. | A47C 20/026 |
| | | | | | | 5/622 |
| 6,202,973 | B1 | * | 3/2001 | Navarin | ............... | A47B 23/002 |
| | | | | | | 248/441.1 |
| 6,334,687 | B1 | * | 1/2002 | Chino | .................... | G03B 21/10 |
| | | | | | | 248/920 |
| 6,695,266 | B1 | * | 2/2004 | Tsai | ....................... | A47G 33/06 |
| | | | | | | 248/125.8 |
| 7,241,017 | B2 | * | 7/2007 | Ariyoshi | ................ | G03B 21/10 |
| | | | | | | 248/922 |

(Continued)

FOREIGN PATENT DOCUMENTS

CN  201263191 Y  6/2009
CN  201428912 Y  3/2010

*Primary Examiner* — Anita M King
(74) *Attorney, Agent, or Firm* — Zhigang Ma (57) ABSTRACT

A bracket for an electronic device includes a supporting plate and a base. The supporting plate comprises a supporting member and two mounting blocks mounted to the supporting member including two supporting poles. One end of each mounting block is supported by the base. The supporting poles can be mounted to the corresponding mounting blocks to enable the supporting member to be in different positions, thereby changing a distance between a bottom portion of the supporting member and the base.

17 Claims, 9 Drawing Sheets

(56) References Cited

U.S. PATENT DOCUMENTS

| | | | | |
|---|---|---|---|---|
| 7,424,991 B2* | 9/2008 | Kim | ............... | F16C 11/0619 |
| | | | | 248/121 |
| 7,742,288 B2* | 6/2010 | Min | ............... | F16M 11/00 |
| | | | | 248/125.8 |
| 7,793,897 B2* | 9/2010 | Wang | ............... | F16M 11/10 |
| | | | | 248/121 |
| 7,876,552 B2* | 1/2011 | Guo | ............... | F16B 7/105 |
| | | | | 248/917 |
| 8,628,050 B2* | 1/2014 | Truckor | ............... | F16M 11/30 |
| | | | | 182/82 |
| 9,167,707 B1* | 10/2015 | Wang | ............... | H05K 5/0204 |
| 2007/0103605 A1* | 5/2007 | Maruta | ............... | F16M 11/00 |
| | | | | 348/797 |
| 2009/0095870 A1* | 4/2009 | Chang | ............... | F16M 11/00 |
| | | | | 248/440 |
| 2014/0263890 A1* | 9/2014 | McCarthy | ............... | F16M 11/10 |
| | | | | 248/205.1 |

* cited by examiner

BRACKET FOR ELECTRONIC DEVICE

CROSS-REFERENCE TO RELATED APPLICATIONS

This application claims priority to Chinese Patent Application No. 201310577191.3 filed on Nov. 19, 2013 in the China Intellectual Property Office, the contents of which are incorporated by reference herein.

FIELD

The subject matter herein generally relates to a bracket for an electronic device.

BACKGROUND

A bracket is used to support an electronic device.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "comprising, but not necessarily limited to"; it specifically indicates open-ended inclusion or membership in the so-described combination, group, series and the like.

The present disclosure is in relation to a bracket for supporting an electronic device.

Figure 1:
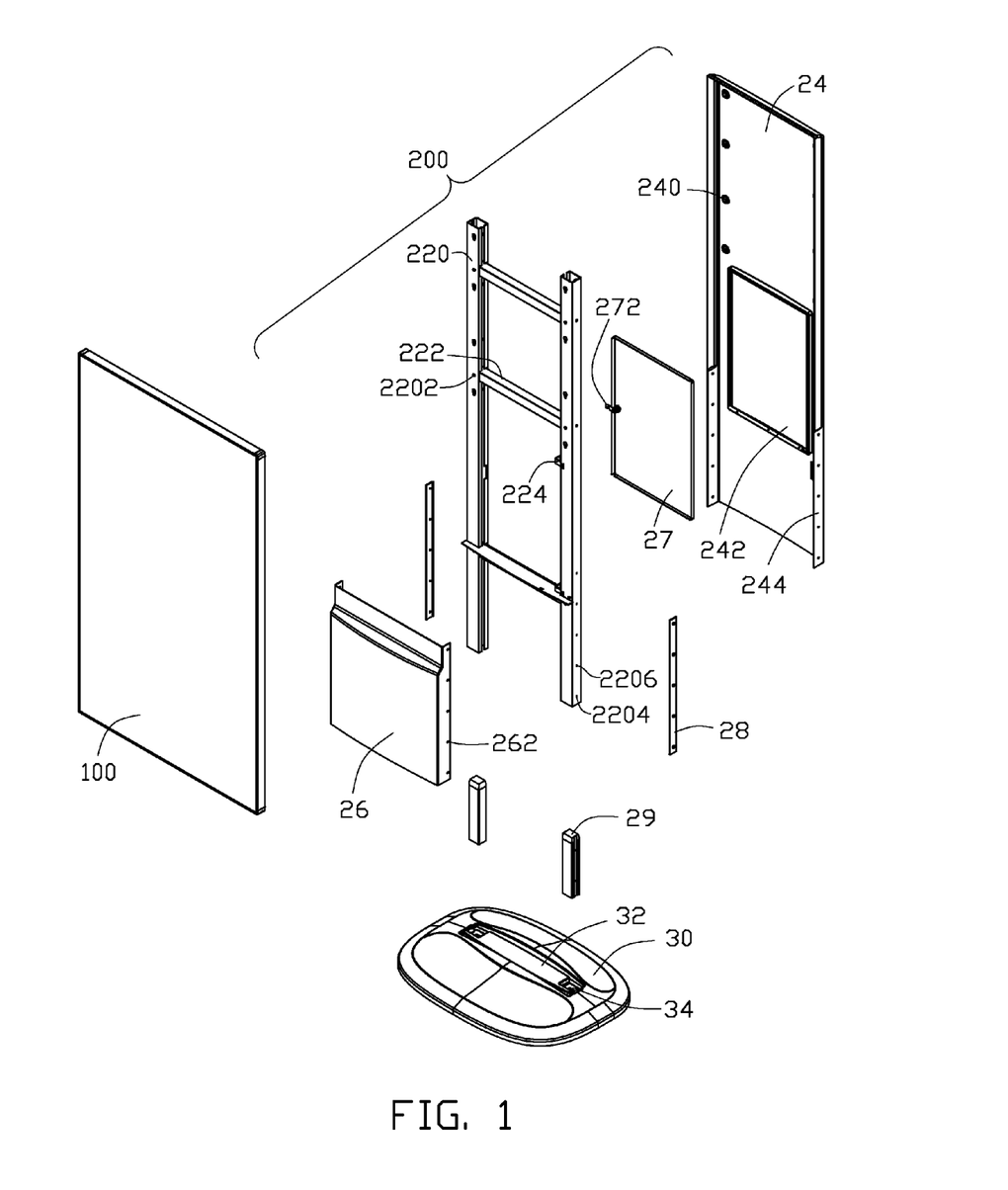
FIG. 1 is an exploded, isometric view of an embodiment of a bracket for an electronic device.
Figure 2:
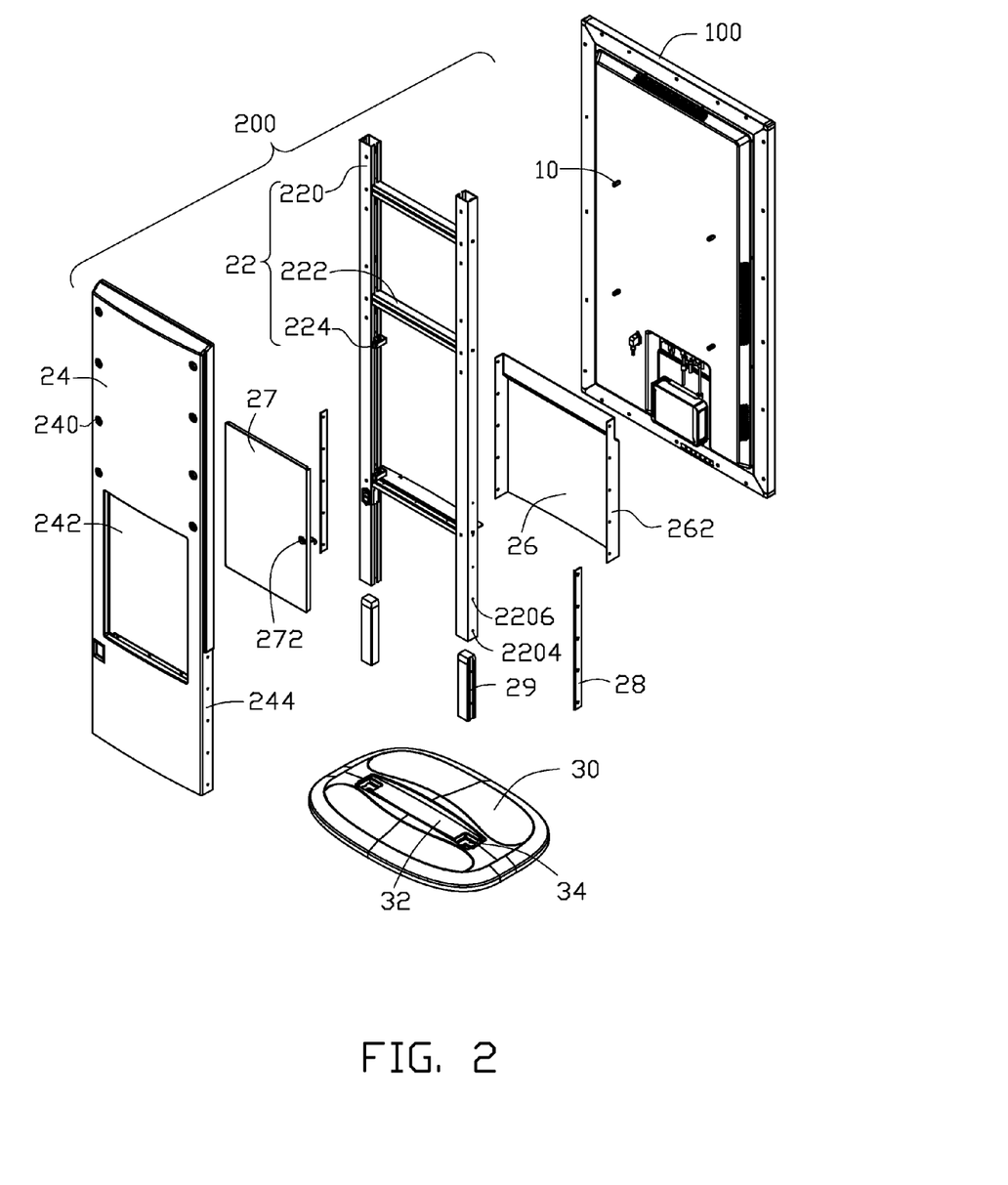
FIG. 2 is similar to FIG. 1, but viewed in a different angle.

FIGS. 1 and 2 illustrate an embodiment of a bracket 200 for supporting an electronic device 100. The bracket 200 comprises a supporting plate 20 (shown in FIGS. 8 and 9) and a base 30. In one embodiment, the electronic device 100 is a panel display or a panel TV set. The electronic device 100 comprises a plurality of positioning posts 10.

The supporting plate 20 comprises a supporting member 22, a back plate 24, a front plate 26, an operating member 27, two mounting members 28, and two mounting blocks 29. The supporting member 22 comprises two supporting poles 220 substantially parallel to each other, a plurality of connecting poles 222 substantially parallel to each other, and two connecting portions 224. Two ends of each connecting pole 222 are mounted to the corresponding supporting poles 220. The supporting poles 220 are hollow. The supporting member 22 can be aluminum-alloy. The back plate 24 defines a plurality of second positioning holes 240 and an opening 242. The opening 242 is substantially rectangular. The back plate 24 comprises two second side portions 244 and defines a first pattern taper. The back plate 24 is substantially rectangular. The front plate 26 comprises two first side portions 262 and defines a second pattern taper different from the first pattern taper. The operating member 27 comprises an engaging portion 272. Each mounting member 28 is substantially L-shaped. The back plate 24, the front plate 26, the operating member 27, the two mounting members 28, and the two mounting blocks 29 are plastic and the method of plastics suction molding is used.

Figure 3:
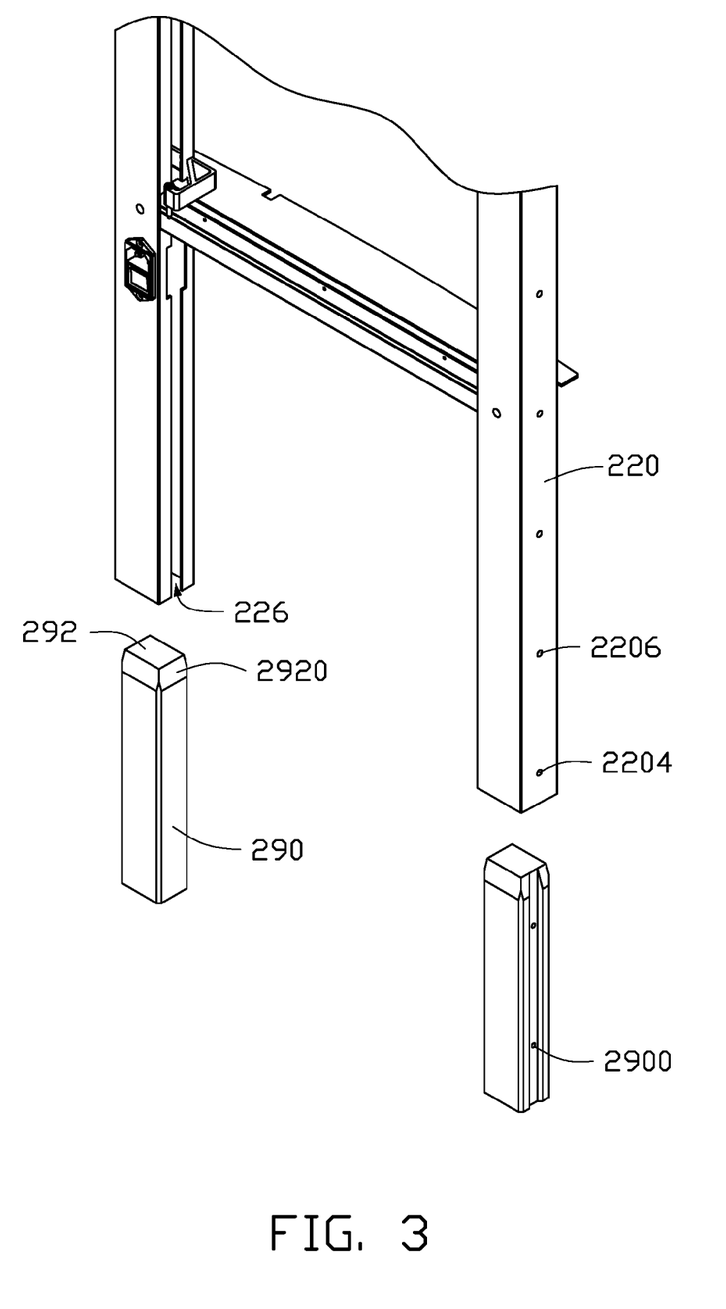
FIG. 3 is an isometric, cutaway view of a supporting member and two mounting blocks of FIG. 2.
Figure 4:
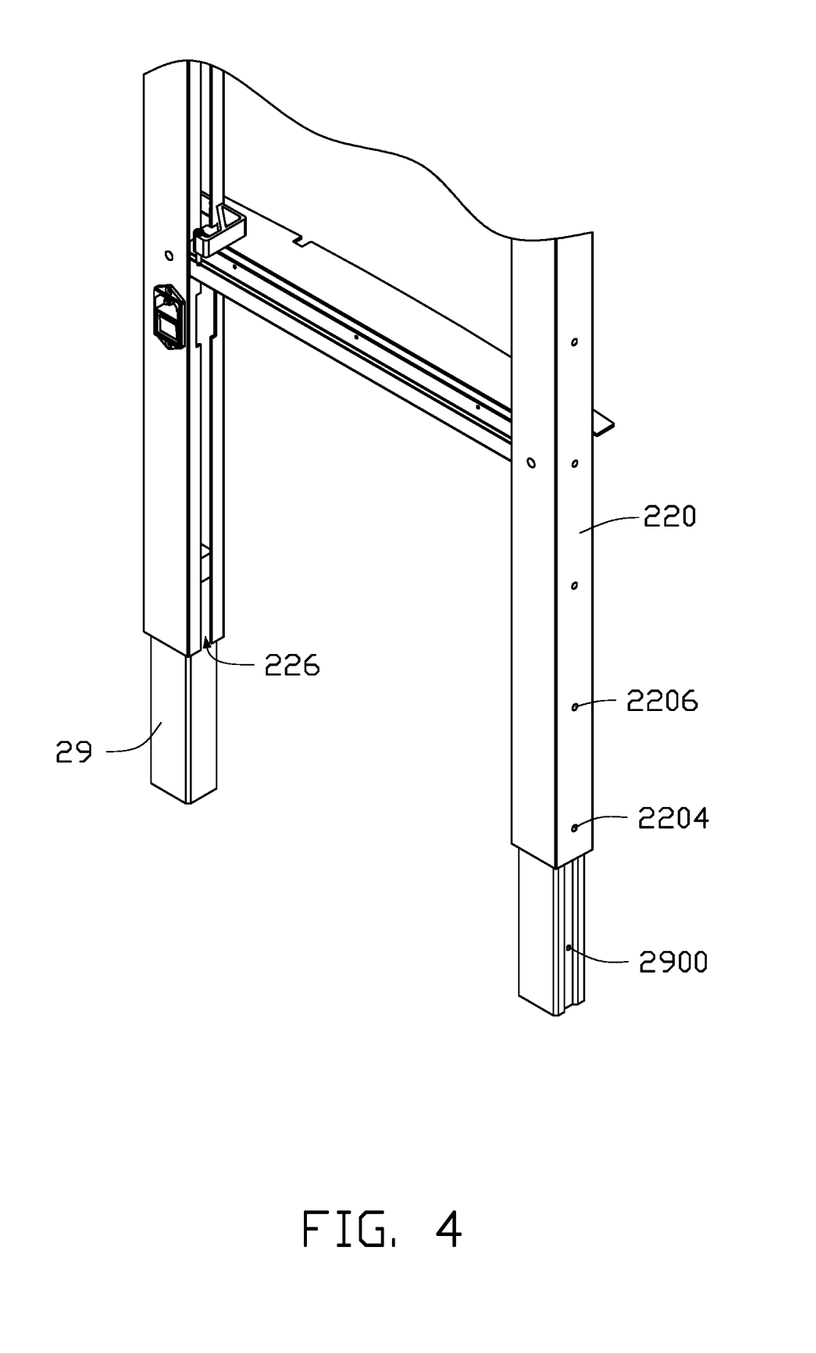
FIG. 4 is an isometric, cutaway, assembled view of the supporting member and the mounting blocks of FIG. 3, but the supporting member is in a first position.
Figure 5:
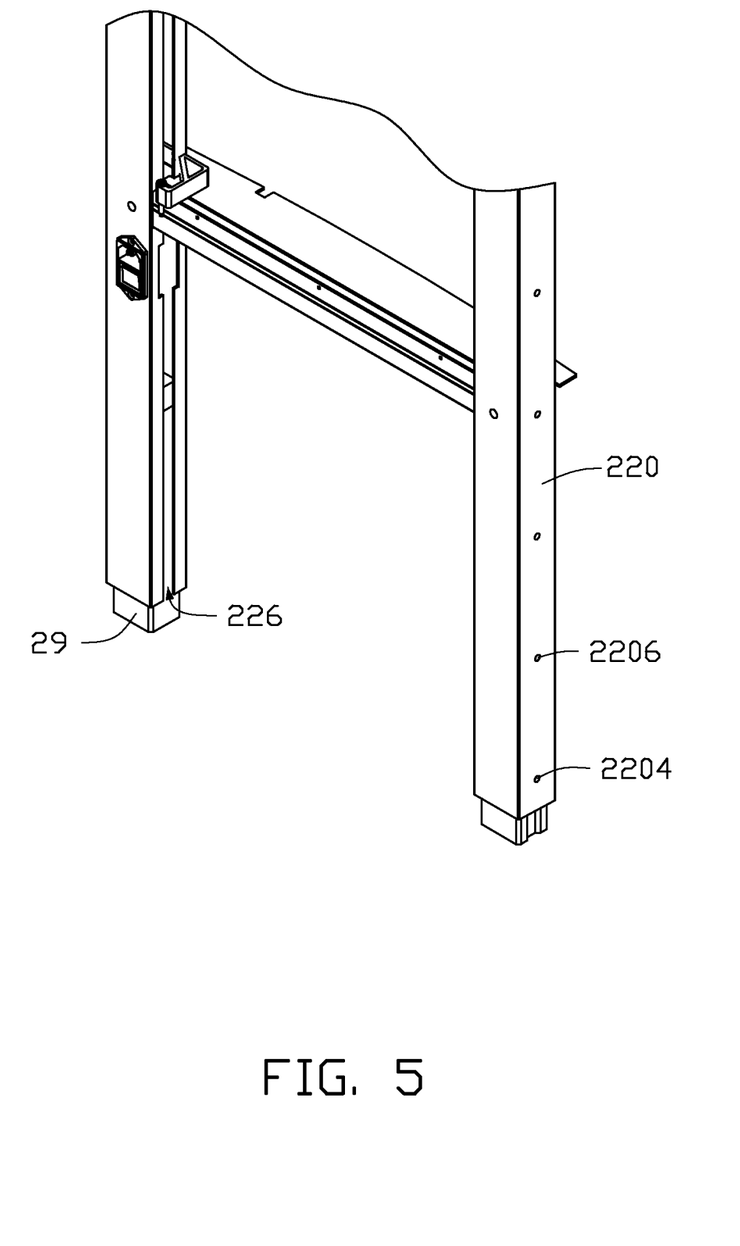
FIG. 5 is an isometric, cutaway, assembled view of the supporting member and the mounting blocks of FIG. 3, but the supporting member is in a second position.

FIGS. 3-5 illustrate that each supporting pole 220 defines a plurality of first positioning holes 2202 (shown in FIG. 1), a plurality of first securing holes 2204, a plurality of second securing holes 2206, and a slot 226. Each mounting block 29 comprises a securing portion 290 and a guiding portion 292 extending from the securing portion 290. Each securing portion 290 defines two mounting holes 2900. Each guiding portion 292 comprises three inclined guiding surfaces 2920. One of the guiding surfaces 2920 is coupled between the other two. The mounting holes 2900 can be mounted to the corresponding first securing holes 2204 and the corresponding second securing holes 2206, thereby the supporting poles 220 can be mounted to the corresponding mounting blocks 29 and the supporting member 22 in different positions. FIG. 4 illustrates when the supporting member 22 is in a first position. FIG. 5 illustrates when the supporting member 22 is in a second position.

Figure 6:
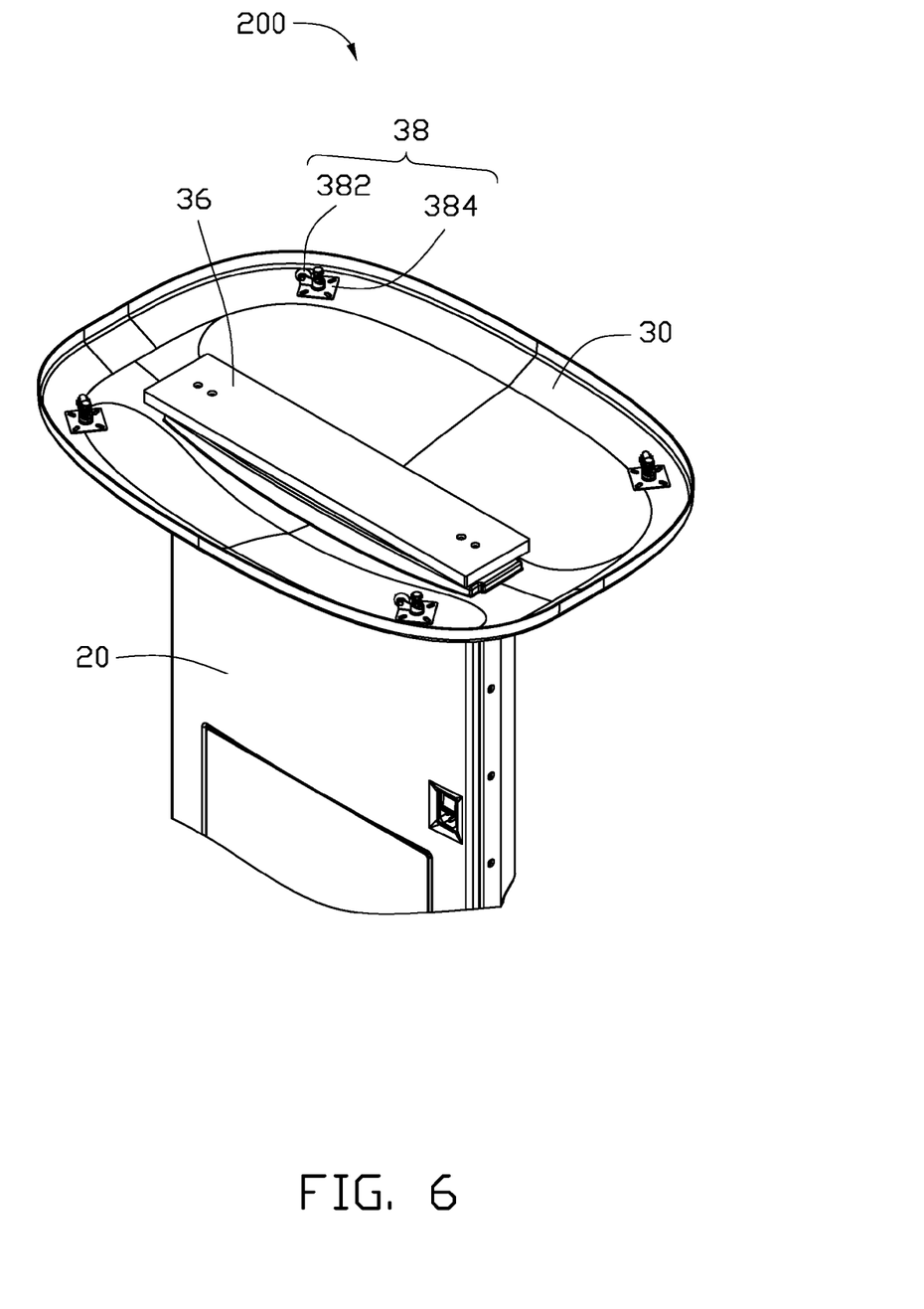
FIG. 6 is an assembled, isometric view of a base and a supporting plate of FIG. 1, but a front plate is not shown.
Figure 7:
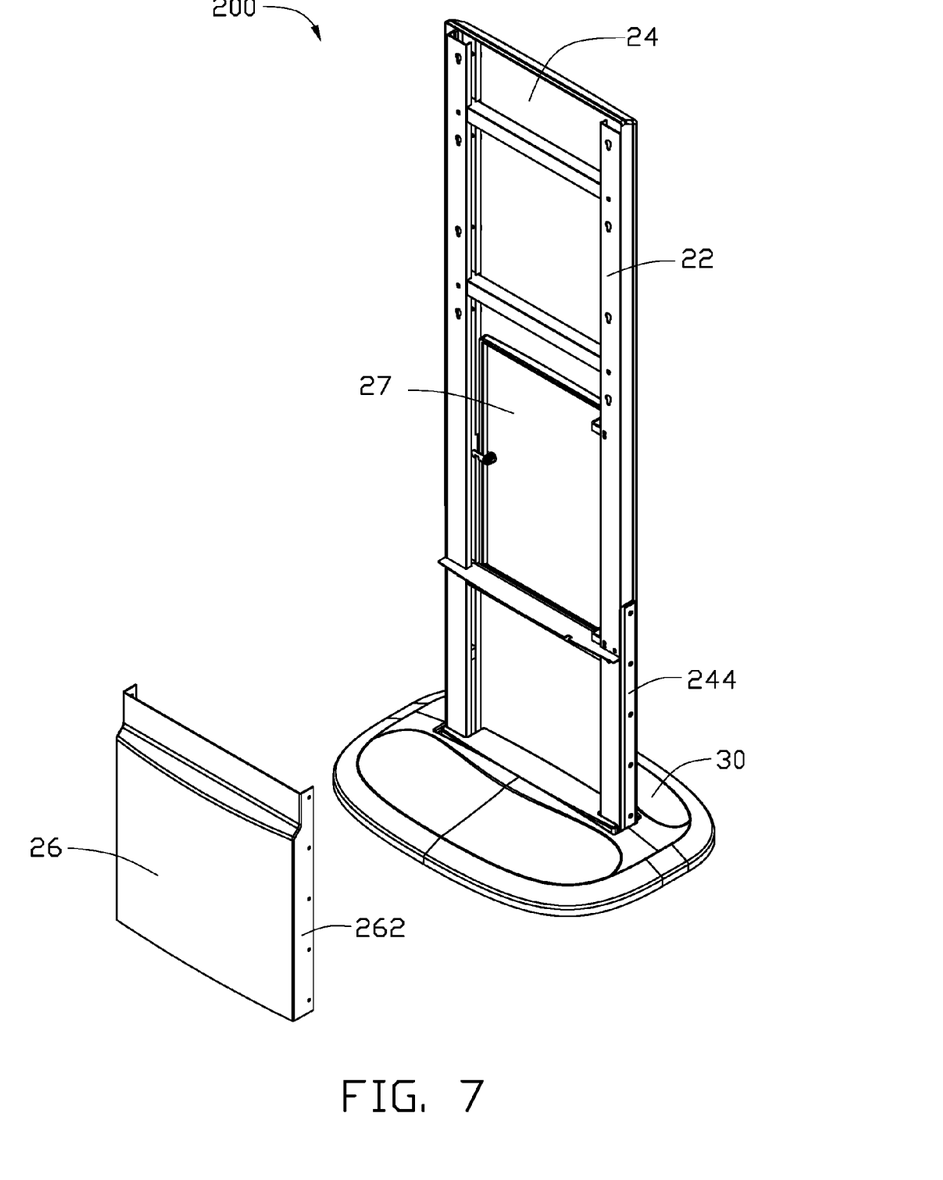
FIG. 7 is similar to FIG. 6, but viewed in a different angle.

FIGS. 2 and 6 illustrate that the base 30 comprises a receiving portion 32, a securing block 36, and a plurality of movable members 38. The base 30 defines two connecting holes 34. Each movable member 38 comprises a wheel 382 and a securing portion 384 rotatably coupled to the wheel 382. In one embodiment, the base 30 is formed by the method of plastics suction molding with ABS (Acrylonitrile Butadiene Styrene). The wheels 382 can be moved to drive the base 30 to move.

FIGS. 2-7 illustrate when in assembly, the supporting member 22 is received in the back plate 24. The operating member 27 is received in the opening 242. The engaging portion 272 is engaged with the back plate 24. The connecting portions 224 abut against the operating member 27. The back plate 24 and the supporting member 22 are received in the front plate 26. The first side portions 262 contact the corresponding second side portions 244. The mounting members 28 contact the corresponding first side portions 262. The guiding surfaces 292 guide the corresponding securing portions 290 to slide along the corresponding slots 226. Each fastener (not shown) is fixed with one corresponding first securing hole 2204 and one corresponding mounting hole 2900. The mounting blocks 29 are mounted to the supporting member 22. One end of each mounting block 29 extends through the corresponding connecting hole 34 to be mounted to the securing block 36 and is supported by the base 30. The supporting plate 20 is mounted to the base 30.

Figure 8:
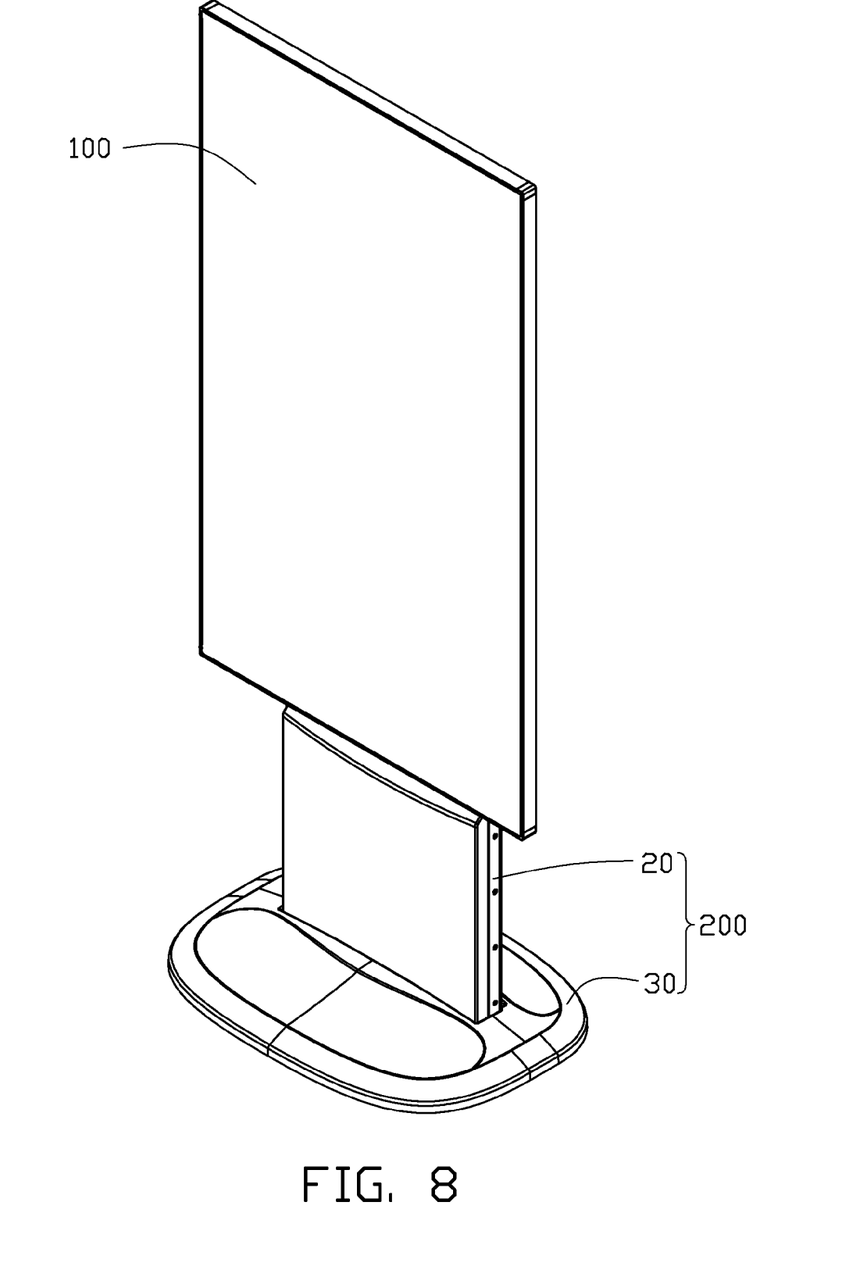
FIG. 8 is an assembled, isometric view of the bracket of FIG. 1, but the electronic device is in a third position.
Figure 9:
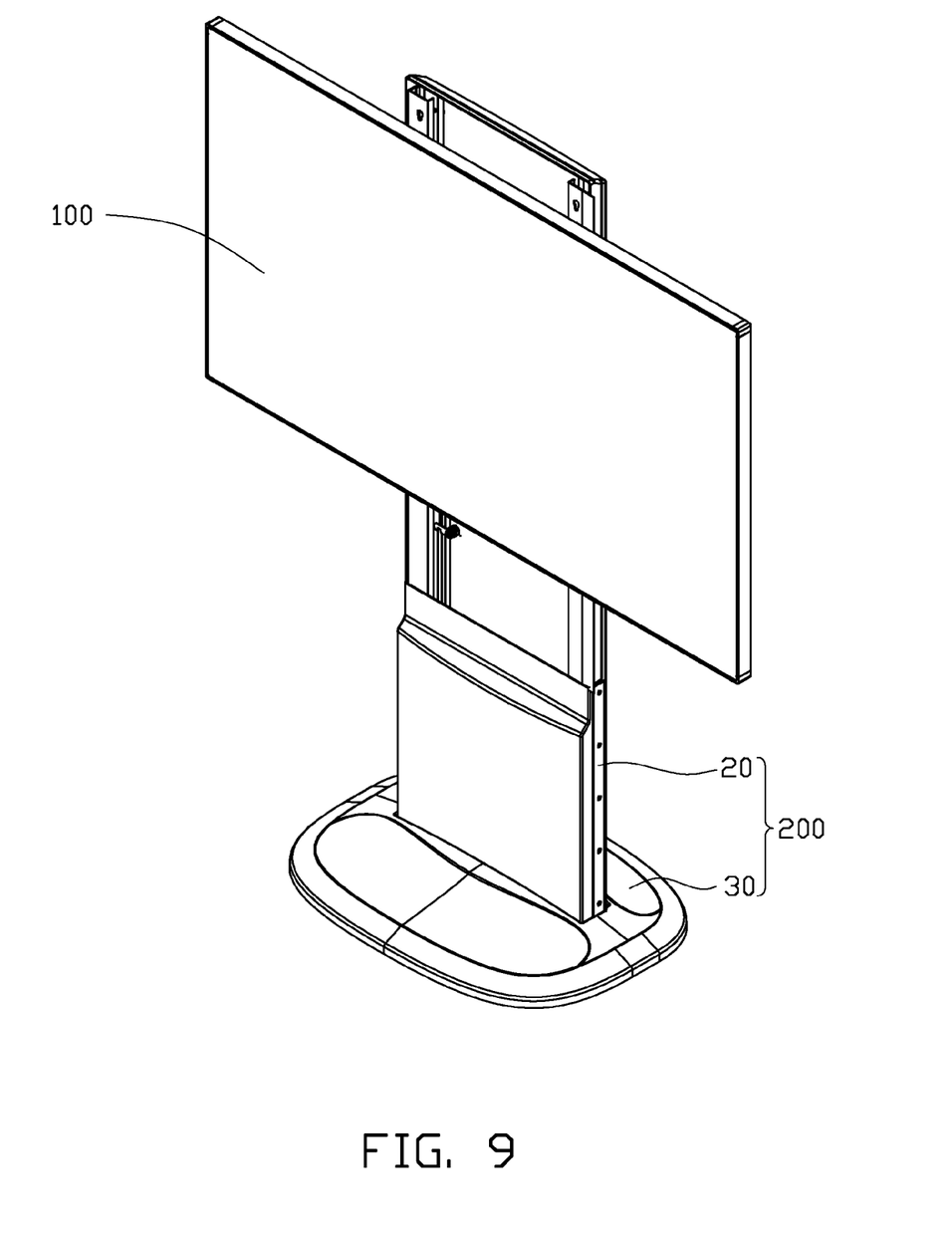
FIG. 9 is similar to FIG. 5, but the electronic device is in a fourth position.

FIGS. 1-2 and 8-9 illustrate when using the bracket 200, the positioning posts 10 are mounted to the corresponding first positioning holes 2202 and the corresponding second positioning holes 240. The electronic device 100 can be mounted to different positions. FIG. 8 illustrates that the electronic device 100 is in a third position. FIG. 9 illustrates that the electronic device 100 is in a fourth position.

In the embodiment, the corresponding mounting hole 2900 of the mounting blocks 29 can be fixed with the corresponding first securing holes 2204 and the corresponding second securing holes 2206 to enable the supporting member 22 to be in different positions, thereby changing a distance between a bottom portion of the supporting member 22 and the base 30. The corresponding positioning posts 10 are mounted to the corresponding first positioning holes 2202 to enable the electronic device 100 to be in different positions.

It is to be understood that even though numerous characteristics and advantages have been set forth in the foregoing description of embodiments, together with details of the structures and functions of the embodiments, the disclosure is illustrative only and changes may be made in the details, especially in the matters of shape, size, and arrangement of parts within the principles of the disclosure to the full extent indicated by the broad general meaning of the terms in which the appended claims are expressed.

What is claimed is:

1. A bracket for an electronic device, comprising:
a base, and
a supporting plate configured to be mounted to the electronic device, the supporting plate comprising:
a supporting member, and
two mounting blocks, one end of each mounting block being supported by the base,
wherein the supporting member comprises two supporting poles, the two mounting blocks can be slidably mounted to the corresponding supporting poles, each supporting poles defines a plurality securing holes in a straight line, and each mounting block is secured in anyone of the plurality securing holes to allow the supporting member to be locked in different positions, thereby changing a distance between a bottom portion of the supporting member and the base, each mounting block comprises a securing portion and a guiding portion extending from the securing portion, each guiding portion guides the corresponding securing portion to slide to be received in the corresponding supporting pole.

2. The bracket of claim 1, wherein the plurality securing holes comprises a first securing hole and a second securing hole, each mounting block defines a mounting hole, each mounting hole can be fixed with one corresponding first securing hole or one corresponding second securing hole, thereby the supporting member is in a first position or a second position, and a first distance or a second distance is defined between the supporting member and the base.

3. The bracket of claim 1, wherein the bracket further comprises an operating member, wherein the supporting member comprises two connecting portions, the operating member roatably mounted to the two connecting portions.

4. The bracket of claim 1, wherein the supporting plate further comprises a back plate that is substantially rectangular, the supporting member received in the back plate.

5. The bracket of claim 4, wherein the supporting member defines two first positioning holes and the back plate defines two second positioning holes, wherein the electronic device is mountable to the first positioning holes and the second positioning holes.

6. The bracket of claim 1, wherein each guiding portion comprises two inclined surfaces coupled to each other, the surfaces guiding the securing portions to slide to receive in the corresponding supporting poles.

7. The bracket of claim 1, wherein each supporting pole defines a slot, each guiding portion guides the corresponding securing portion to slide to be received in the corresponding slot.

8. The bracket of claim 1, wherein the supporting member further comprises a connecting portion, the supporting plate defines an opening, the supporting plate further comprises an operating member rotatably mounted to the connecting portion and received in the opening.

9. The bracket of claim 1, wherein the base defines two connecting holes, wherein the mounting blocks are received in the corresponding connecting holes and are mounted to the base.

10. A bracket for an electronic device, comprising:
a base comprising a movable member, the movable member enabling movement of the base, and
a supporting plate configured to be mounted to the electronic device comprising:
a supporting member,
a front plate,
two mounting members, each mounting member is mounted to the front plate and the supporting member,
a back plate mounted to the supporting member, and
two mounting blocks mounted to the supporting member, one end of each mounting block being supported by the base;
wherein the electronic device can be mounted to the back plate and the supporting member to be in different positions.

11. The bracket of claim 10, wherein the supporting member defines two first positioning holes, the back plate defines two second positioning holes, the electronic device comprises a positioning post, the positioning post mounted to the corresponding first positioning holes and the corresponding second positioning holes to enable the electronic device to be in two positions.

12. The bracket of claim 11, wherein the supporting member comprises two supporting poles substantially parallel to each other with first positioning holes defined in each supporting pole.

13. The bracket of claim 11, wherein the base defines two connecting holes, the mounting blocks are received in the two connecting holes and supported by the base.

14. The bracket of claim 13, wherein the supporting member comprises two supporting poles, each mounting block comprises a securing portion and a guiding portion extending from the securing portion, each guiding portion guides the corresponding securing portion to slide to receive in the corresponding supporting pole.

15. The bracket of claim 14, wherein each securing portion defines a mounting hole, each positioning hole defines a first securing hole, the supporting member is in a first position when the mounting hole is fixed with the first securing hole, each positioning hole defines a second securing hole, the supporting member is in a second position when the mounting hole is fixed with the second securing hole.

16. The bracket of claim 14, wherein each guiding portion comprises two inclined surfaces coupled to each other, the surfaces guide the securing portions to slide to receive in the corresponding supporting poles.

17. The bracket of claim 10, further comprising an operating member, wherein the supporting member comprises two connecting portions, the operating member is roatably mounted to the two connecting portions.

\* \* \* \* \*